United States Patent

[11] 3,622,210

[72] Inventor William Thelen
Glen Ellyn, Ill.

[21] Appl. No. 89,597
[22] Filed Nov. 16, 1970
[45] Patented Nov. 23, 1971

[73] Assignee Bell Telephone Laboratories, Incorporated
Murray Hill, Berkeley Heights, N.J.

[54] TRANSFORMERLESS FREQUENCY DOUBLER
7 Claims, 3 Drawing Figs.

[52] U.S. Cl. .......... 307/220, 307/261, 307/262, 307/317, 321/47, 324/119, 328/20, 328/26
[51] Int. Cl. .......... H03b 19/14
[50] Field of Search .......... 307/220, 225, 261, 262, 271, 317; 328/20, 26, 32; 324/89, 119; 321/47

[56] References Cited

UNITED STATES PATENTS

| | | | |
|---|---|---|---|
| 2,670,445 | 2/1954 | Felker .......... | 307/317 X |
| 3,196,291 | 7/1965 | Woodward, Jr. .......... | 307/261 X |
| 3,207,923 | 9/1965 | Prager .......... | 307/317 X |
| 3,448,387 | 6/1969 | Brandt et al. .......... | 307/220 X |

*Primary Examiner*—Stanley T. Krawczewicz
*Attorneys*—R. J. Guenther and R. B. Ardis

ABSTRACT: A transformerless frequency doubler with superior high-frequency performance takes the form of a resistive voltage divider connected across the driving source to supply a first wave in the form of a full-wave signal, a half-wave rectifier connected to the driving source to supply a second wave in the form of half cycles of the signal at a magnitude substantially twice the magnitude of the half cycles of the first wave, and a common-base transistor stage connected to combine the two waves in phase opposition across a resistor to provide a full-wave rectified output.

INVENTOR
W. THELEN
BY R. B. Ardis
ATTORNEY

TRANSFORMERLESS FREQUENCY DOUBLER

2. A transformerless frequency doubler in accordance with claim 1 in which said combining means comprises a transistor amplifier.

3. A transformerless frequency doubler in accordance with claim 1 in which said combining means comprises a common-base transistor amplifier.

BACKGROUND OF THE INVENTION

This invention relates generally to frequency doublers and, more particularly, to frequency doublers of the full-wave rectifier type.

In the past, the most common form of frequency doubler has been a full-wave rectifier. Such a circuit has a strong component in its output at twice the input frequency which readily can be separated from other component frequencies by a relatively simple band selection filter. Full-wave rectifiers, however, have generally relied upon transformers to produce balanced inputs or outputs or to provide phase inversion and, hence, are not well suited to fabrication by modern integrated circuit techniques. A somewhat different approach is that disclosed in U.S. Pat. No. 3,519,846 which issued July 7, 1970, to F. U. Bacci. This latter approach makes use of an appropriately biased common-emitter transistor stage which half-wave rectifies and inverts the driving signal and a resistive path which supplies the driving signal in an attenuated form to the collector electrode of the transistor stage. The attenuated wave and the half-wave rectifier wave are combined at that point and adjusted in relative magnitude so that the half cycles of the rectified waves are twice as large as the half cycles of the attenuated full wave. A full-wave rectified output appears at the collector electrode of the transistor stage. This result is achieved by Bacci with a minimum of circuit complexity and, with the exception of an input transformer needed to provide a biasing path for the transistor stage, without the use of transformers.

In the frequency doubler disclosed in the Bacci patent, the remaining input transformer still precludes use of integrated circuit fabrication techniques to the fullest possible extent and, even more importantly, effectiveness tends to be limited at high frequency. Phase shift through the transistor tends to cause serious phase misalignment between the attenuated wave and the half-wave rectified wave at frequencies of the order of 100 kilohertz, rendering the circuit substantially useless above such frequencies.

A principal object of the present invention is to avoid completely any need for transformers in a frequency doubler of the full-wave rectifier type.

Another object of the invention is to provide a substantial improvement in the high-frequency response of a frequency doubler of the full-wave rectifier type.

SUMMARY OF THE INVENTION

In accordance with the present invention, transformers are entirely eliminated from and previous high-frequency limitations are overcome in a frequency doubler of the full-wave rectifier type by supplying both an attenuated replica of the driving signal and a half-wave rectified portion of the driving signal over substantially passive paths and subtracting one from the other to form a full wave rectified output. No input transformer is needed for biasing purposes and, because both waves are supplied over substantially passive paths, phase shift does not begin to cause serious phase misalignment until much higher frequencies are reached.

More particularly, in accordance with the invention, the passive supply paths take the form, respectively, of a resistive voltage divider connected across the driving source and a resistor and a half-wave rectifier connected in series with each other across the same source, and a common-base transistor stage is used to subtract one wave from the other across an emitter resistor. The phase shift incurred in such paths is substantially matched over an extremely broad range of frequencies, permitting use of the frequency doubler at input signal frequency as high as 3 megahertz without further compensation and as high as 30 megahertz with suitable capacitive compensation. Because the transistor stage is used for combining the two waves rather than as a transmission element in either path, its internal phase shift does not adversely affect performance.

In at least one important embodiment of the invention, the half-wave rectifier used in one of the supply paths is, advantageously, a semiconductor diode. Such a diode, however, has a forward-conducting voltage threshold which, unless cancelled or otherwise compensated for, can result in something less than full half cycles of the driving phase being presented to the transistor and its associated resistor for subtraction. In accordance with a feature of the invention, that voltage threshold is cancelled with the aid of a second substantially identical semiconductor diode, connected in series with the first but poled in the opposite direction, and a voltage source connected across the second diode to provide sufficient voltage to bias the second diode into conduction in the forward direction.

THE DRAWING

DETAILED DESCRIPTION

Figure 1:
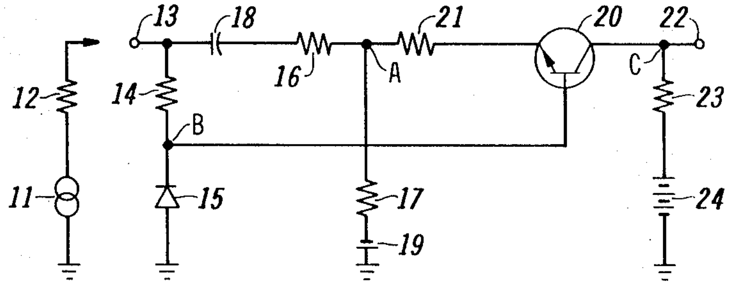
FIG. 1 illustrates an embodiment of the invention employing only a single semiconductor diode to provide half-wave rectification.

In the simplified embodiment of the invention illustrated in FIG. 1, a driving source 11 and its effective internal resistance 12 are shown adapted to supply a driving signal to the input terminals of the frequency doubler. One of these input terminals is shown as terminal 13 and the other is shown simply as ground. Within the frequency doubler itself, a resistor 14 and a semiconductor diode 15 are connected in series between input terminal 13 and ground, as is also a resistive voltage divider made up of a pair of resistors 16 and 17. Diode 15 is poled, as shown, for forward current flow in the direction from ground toward the junction with resistor 14. A coupling capacitor 18 is connected between input terminal 13 and resistor 16 to block DC and a small negative direct voltage source 19 is connected between resistor 17 and ground to provide the required emitter-base bias for the transistor stage. The transistor stage takes the form of an NPN-transistor 20 having its base electrode connected directly to the junction between diode 15 and resistor 14, its emitter electrode connected through a resistor 21 to the junction between resistors 16 and 17, and its collector electrode connected both to an output terminal 22 and through a resistor 23 to a positive direct voltage source 24.

As shown in FIG. 1, positive voltage source 24 places a reverse bias on the collector-base junction of transistor 20 through resistor 23 and negative voltage source 19 places a forward bias on the emitter-base junction through resistors 17 and 21. Capacitor 18 serves to confine the DC from source 19 to its intended path.

Figure 3:
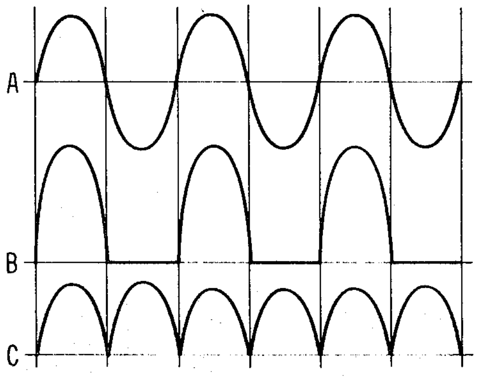
FIG. 3 is a set of waveforms illustrating operation of the embodiments of the invention shown in FIGS. 1 and 2.

Operation of the embodiment of the invention illustrated in FIG. 1 is best explained with the aid of the voltage waveforms shown in FIG. 3. Waveform A appears at point A, the junction between voltage-dividing resistors 16 and 17 in FIG. 1. Waveform B appears at point B, the junction between resistor 14 and diode 15. Finally, waveform C appears at point C and is the output of the frequency doubler appearing at output terminal 22.

As shown in FIG. 3, waveform A is a full-wave attenuated replica of the driving signal supplied by source 11 in FIG. 1, its magnitude determined by the resistances of voltage-dividing resistors 16 and 17. Waveform B, on the other hand, results from the half-wave rectification of the driving signal performed in the path comprising resistor 14 and diode 15. For purposes of illustration, diode 15 in FIG. 1 is assumed to have no forward conducting voltage threshold, so full 180° half cycles appear. Resistor 14 is so related in resistance magnitude to resistors 16 and 17 that each half cycle of the half-wave rectified waveform B is substantially twice the amplitude of each half cycle of waveform A. As illustrated, waveforms A and B are in substantially exact phase alignment.

In accordance with an important feature of the present invention, waveform A is subtracted from waveform B across resistor 21 in FIG. 1. Since transistor 20 is operated in the common base configuration, with a forward bias across its emitter-base junction, the voltage at the base of transistor 20 is substantially equal to that at the emitter. Waveform B, therefore, also appears at the emitter of transistor 20, at the opposite end of resistor 21 from waveform A. Waveform C is the resultant waveform for the current through resistor 21 and appears also at the collector of transistor 20 and, hence, at output electrode 22. As shown, waveform C is a full-wave rectified form of the driving signal from source 11, containing the usual strong component frequency at twice the driving frequency. Because the circuit is completely devoid of transformers, it is particularly well suited for fabrication in integrated circuit form and, because of its use of only passive components in both paths supplying waves to the subtraction circuitry, it does not encounter serious phase misalignment problems until extremely high driving frequencies are reached.

Figure 2:
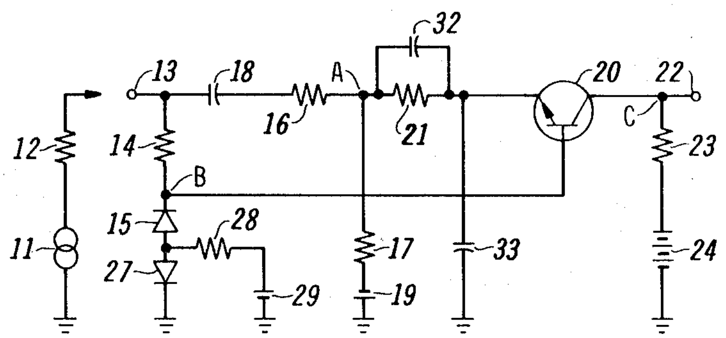
FIG. 2 illustrates a somewhat more elaborate embodiment of the invention employing both compensating capacitors for improved high-frequency performance and a second semiconductor diode arranged to cancel the forward voltage threshold of the first.

The embodiment of the invention illustrated in FIG. 2 is arranged to cancel the effect of the forward conducting voltage threshold of diode 15 and is provided with capacitive compensation to correct minor phase misalignments at particularly high driving frequencies. As shown, the frequency doubler is identical with the simplified version illustrated in FIG. 1 in all other respects and similar components bear the same reference numerals.

Compensation for the forward conducting voltage threshold of semiconductor diode 15 in the frequency doubler shown in FIG. 2 is provided by a circuit which includes a substantially identical semiconductor diode 27, a resistor 28, and a small positive direct voltage source 29. Diode 27 is poled oppositely from diode 15 and is connected between diode 15 and ground. Resistor 28 and voltage source 29 are connected in series from the junction between diodes 15 and 27 to ground. In accordance with a feature of the invention, voltage source 29 is sufficient to overcome the forward voltage threshold of diode 27, which is normally approximately 0.7 volt. Diode 27 is, therefore, biased in the forward direction, permitting current from driving source 11 to flow to diode 15 and the junction between diodes 15 and 27 is held at a steady 0.7 volt. This steady 0.7 volt has the effect of cancelling the 0.7 volt threshold of diode 15 and permits diode 15 to perform substantially perfect half-wave rectification.

Phase compensation in the embodiment of the invention shown in FIG. 2 is accomplished by a small capacitor 32 placed in parallel with subtraction resistor 21 and by a small capacitor 33 connected from the emitter of transistor 20 to ground. Capacitor 32 serves to increase the high-frequency gain of transistor 20 and capacitor 33 provides further correction for both the high-frequency gain of transistor 20 and the phase of the half-wave rectified signal appearing at the emitter of transistor 20.

What is claimed is:

1. A transformerless frequency doubler adapted to be driven from an AC source which comprises a pair receiving input terminals for receiving a signal from said source, a first resistor and a half-wave rectifier connected in series in a first path between said terminals, second and third resistors connected in series in a second path between said terminals, said first, second and third resistors being so related to one another is resistance magnitude that the amplitude of the half cycles of the rectified signal at the junction between said first resistor and said half-wave rectifier is substantially twice the amplitude of the half cycles of the signal at the junction between said second and third resistors, and means to combine the wave at the junction between said first resistor and said half-wave rectifier and the wave at the junction between said second and third resistors to provide a full-wave rectified output.

2. A transformerless frequency doubler in accordance with claim 1 in which said combining means comprises a transistor amplifier.

3. A transformerless frequency doubler in accordance with claim 1 in which said combining means comprises a common-base transistor amplifier.

4. A transformerless frequency doubler in accordance with claim 1 in which said combining means comprises a fourth resistor and a transistor, said fourth resistor is connected between one of said junctions and the emitter of said transistor, the base of said transistor is connected to the other of said junctions, and said full-wave rectified output is produced at the collector of said transistor.

5. A transformerless frequency doubler in accordance with claim 4 which includes high-frequency compensation means in the form of a first capacitor connected in parallel with said fourth resistor and a second capacitor connected from the emitter of said transistor to a point of reference potential.

6. A transformerless frequency doubler in accordance with claim 4 in which said half-wave rectifier comprises a semiconductor diode.

7. A transformerless frequency doubler in accordance with claim 4 in which said half-wave rectifier comprises a first semiconductor diode having a predetermined forward-conducting voltage threshold and which includes an arrangement for cancelling the effect of said voltage threshold which comprises a second semiconductor diode substantially identical to said first diode and connected in series therewith, said diodes being poled in opposite directions, and a voltage source connected across said second diode, said voltage source being poled and having sufficient magnitude to bias said second diode into conduction in the forward direction.

* * * * *

UNITED STATES PATENT OFFICE
CERTIFICATE OF CORRECTION

Patent No. 3,622,210 Dated November 23, 1971

Inventor(s) William Thelen

It is certified that error appears in the above-identified patent and that said Letters Patent are hereby corrected as shown below:

Column 1, delete lines 2 through 7.

Column 4, line 10, after "pair" delete "receiving" and substitute --of--.

Signed and sealed this 25th day of April 1972.

(SEAL)
Attest:

EDWARD M.FLETCHER,JR.
Attesting Officer

ROBERT GOTTSCHALK
Commissioner of Patents

ORM PO-1050 (10-69)

USCOMM-DC 60376-P69
☆ U.S. GOVERNMENT PRINTING OFFICE : 1969 O—366-334